(12) United States Patent
Wezyk et al.

(10) Patent No.: US 7,334,831 B2
(45) Date of Patent: Feb. 26, 2008

(54) CONVERTIBLE VEHICLE ROOF HAVING A SWIVELABLE BOW

(75) Inventors: Wojciech Wezyk, Sindelfingen (DE); Thomas Halbweiss, Remseck (DE); Berthold Klein, Rutesheim (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 0 days.

(21) Appl. No.: 11/538,282

(22) Filed: Oct. 3, 2006

(65) Prior Publication Data
US 2007/0102954 A1 May 10, 2007

(30) Foreign Application Priority Data
Oct. 5, 2005 (DE) .............. 10 2005 047 846

(51) Int. Cl.
*B60J 7/00* (2006.01)
(52) U.S. Cl. .............................. 296/107.09; 296/116
(58) Field of Classification Search .......... 296/107.09, 296/116, 121, 122
See application file for complete search history.

(56) References Cited

U.S. PATENT DOCUMENTS

| | | | | |
|---|---|---|---|---|
| 2,768,857 A | | 10/1956 | Albrecht | |
| 3,473,842 A | * | 10/1969 | Glossop, Jr. et al. | 296/116 |
| 5,004,291 A | * | 4/1991 | Bauer et al. | 296/116 |
| 5,267,769 A | | 12/1993 | Bonné et al. | |
| 6,048,021 A | * | 4/2000 | Sautter, Jr. | 296/107.09 |
| 6,237,986 B1 | * | 5/2001 | Neubrand et al. | 296/116 |
| 6,416,111 B1 | * | 7/2002 | Neubrand | 296/107.09 |
| 6,464,284 B2 | * | 10/2002 | Neubrand | 296/107.08 |
| 6,550,842 B1 | * | 4/2003 | Halbweiss et al. | 296/107.09 |
| 6,568,751 B2 | * | 5/2003 | Reinsch | 296/107.09 |
| 6,802,554 B1 | * | 10/2004 | Just et al. | 296/107.09 |
| 7,021,695 B2 | * | 4/2006 | Quindt et al. | 296/107.09 |
| 7,275,783 B2 | * | 10/2007 | Dilluvio | 296/107.09 |
| 2003/0052509 A1 | * | 3/2003 | Halbweiss et al. | 296/107.09 |
| 2007/0063531 A1 | * | 3/2007 | Wezyk et al. | 296/107.09 |
| 2007/0063533 A1 | * | 3/2007 | Zehnder et al. | 296/118 |
| 2007/0194597 A1 | * | 8/2007 | Liedmeyer et al. | 296/107.09 |

FOREIGN PATENT DOCUMENTS

| | | |
|---|---|---|
| DE | 41 23 516 C1 | 7/1992 |
| DE | 199 03 411 C1 | 10/2000 |

* cited by examiner

*Primary Examiner*—Kiran B. Patel
(74) *Attorney, Agent, or Firm*—Brooks Kushman P.C.

(57) ABSTRACT

A convertible top for a vehicle includes a folding top frame. The folding top frame has a transversely extending front bow and a pair of oppositely disposed first and second side rails. The front bow has first and second ends. The folding top frame is movable between a closed position in which the folding top frame is longitudinally extended and a stored position in which the folding top frame is folded. The convertible top further includes first and second rotary joints each having a transversely extending swivel axis. The rotary joints respectively link the ends of the front bow to the side rails such that the front bow swivels about the transversely extending swivel axes of the rotary joints as the folding top frame moves between the closed and stored positions in order to reduce space requirements in the stored position of the folding top frame.

15 Claims, 5 Drawing Sheets

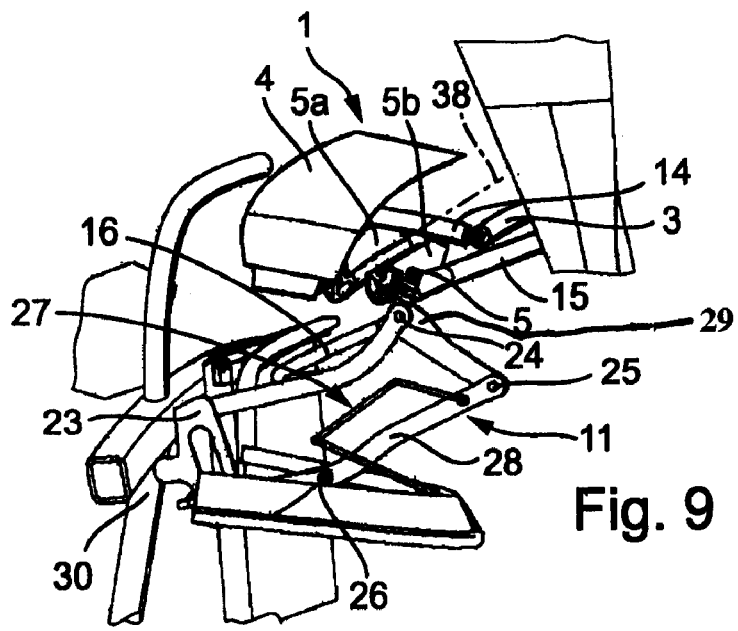
Fig. 9
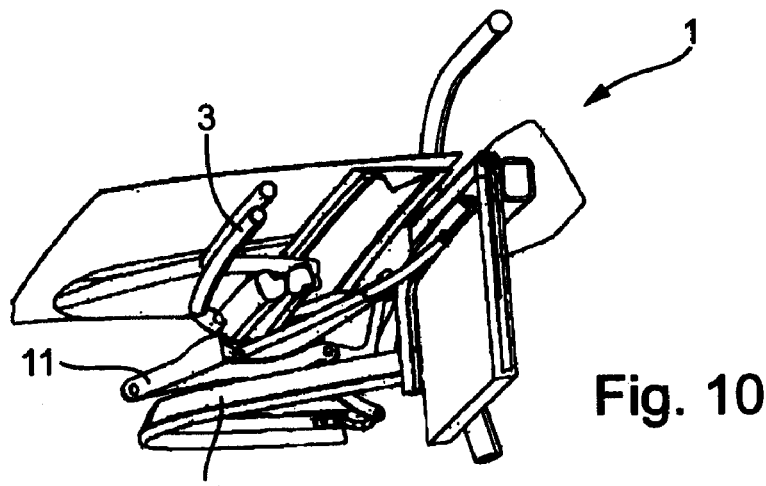
Fig. 10
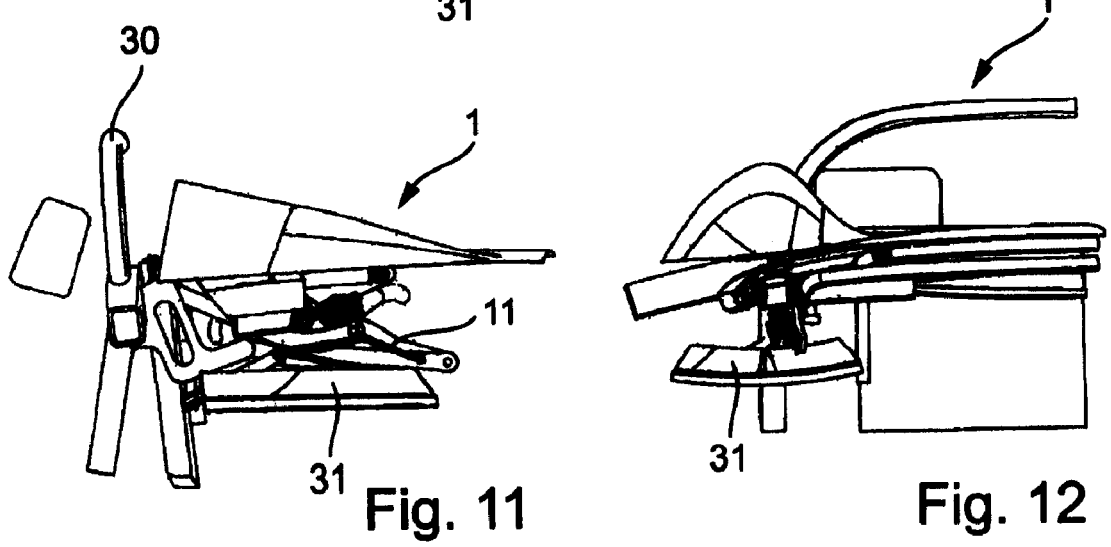
Fig. 11
Fig. 12

CONVERTIBLE VEHICLE ROOF HAVING A SWIVELABLE BOW

CROSS-REFERENCE TO RELATED APPLICATIONS

This application claims foreign priority benefits under 35 U.S.C. § 119(a)-(d) to DE 10 2005 047 846.8, filed Oct. 5, 2005, which is hereby incorporated by reference in its entirety.

BACKGROUND OF THE INVENTION

1. Field of the Invention

The present invention relates to convertible tops for vehicles.

2. Background Art

DE 943 747 (corresponds to U.S. Pat. No. 2,768,857) describes a convertible vehicle roof having a folding top movable between a closed position in which the top covers the vehicle interior and a stored position in which the top is folded and stowed in a storage compartment in the rear of the vehicle to thereby expose the vehicle interior. The top has a frame having oppositely disposed side rails. Each side rail has a pair of pivotally connected rail sections which break inward (i.e., transverse) of the vehicle body when the top is folded. The frame has front, intermediate, and rear bows extending transversely to the longitudinal direction of the vehicle. The front bow attaches to a windshield frame of the vehicle when the top is in the closed position. The intermediate and rear bows may swivel about y-parallel articulated joints for supporting a fabric cover of the top. A retaining bracket situated in the rear part of the top secures the rear part of the fabric cover under tension when the top is in the closed position. Each pair of side rail sections includes three z-parallel rotary joints. This allows the side rails to fold transversely, which in turn ensures a linear motion of the front bow in the x-direction towards the intermediate and rear bows when the top is being folded. The top has a relatively large space requirement when it is folded in its stored position.

SUMMARY OF THE INVENTION

An object of the present invention is a convertible top having a relatively small space requirement when it is folded in its stored position.

In carrying out the above object and other objects, the present invention provides a convertible top (i.e., a folding top). In an embodiment, the convertible top includes a folding top frame having a transversely extending front bow and a pair of oppositely disposed first and second side rails. The front bow has first and second ends. The folding top frame is movable between a closed position in which the folding top frame is longitudinally extended and a stored position in which the folding top frame is folded. The convertible top further includes first and second rotary joints each having a transversely extending swivel axis. The rotary joints respectively link the ends of the front bow to the side rails such that the front bow swivels about the transversely extending swivel axes of the rotary joints as the folding top frame moves between the closed and stored positions in order to reduce space requirements in the stored position of the folding top frame.

As a result of attaching the front bow (i.e., the roof arch) to the folding top frame in a rotationally articulated manner, during the closing motion of the folding top it is possible to swivel the front bow from its essentially horizontal position in the closed position, about a (y-parallel) swivel axis in the transverse direction. This allows the dimension of the folding top to be reduced in the longitudinal direction so that less space is required for storing the folding top. It is advantageous for the swivel motion of the front bow to be mechanically controlled.

The front bow according to first and second alternative embodiments of the present invention is swivelable by at least approximately 90° or by approximately 180° about its y-parallel swivel axis. The upper side of the front bow in the closed position of the folding top points in the direction of the front of the vehicle or in the direction of the rear of the vehicle after the swivel motion according to the first alternative embodiment. The greatest space economy may be realized according to the second alternative embodiment in which the front bow may be swiveled by approximately 180°. The front bow may be stored by swiveling by approximately 180° above, or preferably below, the side rails. Preferably, the y-parallel rotational axis of the front bow in the closed position of the folding top is situated in the rear end region of the vehicle pointing in the direction of the rear of the vehicle.

In an embodiment of the present invention, the front bow extends between two side rails of the folding top frame. The front bow is linked to the side rails at the y-parallel rotary articulated joints of the front bow. For the swivel function it is sufficient for the front bow to have a one-piece design.

To allow motion of the front bow along the longitudinal axis of the vehicle (x-axis) during the storage motion, in an embodiment of the present invention the side rails have a multi-part design for folding in the transverse direction. In particular, the side rails have a two-part design (i.e., front and rear rail sections) for folding in the transverse direction. It is advantageous for each of the side rails to include a pair of rail sections. Each pair of rail sections includes a front rail section and a rear rail section. In the closed position of the folding top, the rail sections of the side rails run essentially parallel to the x-axis. The front and rear rail sections of each side rail are coupled via a z-parallel rotary joint. At their outer ends, the front and rear rail sections each have a z-parallel rotary joint by which they are articulately connected to other folding top linkage components (such as the front bow and a primary kinematic mechanism). When the folding top is stored, the rail sections of each side rail fold inward, similar to the kinematics of an awning.

Each of the two rail section pairs of the side rails advantageously contain a seal for the respective side windows. It is practical for the seal to have a one-part design instead of a two-part design so that a separation point is avoided. To this end the seal is designed, at least in places, so that it may be severely deformed. A spacer or insert, for example, is suitable for this purpose.

The folding top frame may have a plurality of transverse bows (i.e., links, arches) for supporting the fabric cover of the folding top. In an embodiment of the present invention, the folding top frame has a front transverse bow. The front transverse bow is positioned adjacent to the front bow. The front transverse bow is displaceable in the x-parallel direction in a similar manner as for the front bow. To this end, the front transverse bow includes at least three linkage parts which are connected via z-parallel articulated joints. The outer two linkage parts of the front transverse bow are respectively connected to the side rails via two additional z-parallel articulated joints. In a three-piece design of the front transverse bow, two z-parallel linkages are associated with each of the two outer linkage parts. In a two-piece design of the side rails, the front transverse bow is advantageously linked to the front rail sections of the side rails.

In an embodiment, the folding top frame further includes a center transverse bow and a rear corner transverse bow. Each of the center and rear corner transverse bows are swivelable about respective y-parallel rotational axes or, alternatively, are swivelable about a common y-parallel rotational axis. During the storing motion of the folding top, the front transverse bow yields as a result of motion in the x-direction, and the center transverse bow yields as a result of a swivel motion of the front bow which likewise is moving in the x-direction. The rear corner transverse bow is swivelled to allow a more compact package to be obtained in the stored state of the folding top and to provide more space for the fabric cover of the folding top.

In an embodiment of the present invention, the convertible top includes a primary kinematic mechanism for moving the folding top between the closed and stored positions. In an embodiment of the present invention, the primary kinematic mechanism is a four-bar kinematic linkage. The four bar kinematic linkage includes, on each side, y-parallel rotary joints and front and rear main guide rods which are connected to one another via an intermediate support. On their lower ends, the two main guide rods are fixed in a rotationally articulated manner to the vehicle body. In particular, the lower ends of the two main guide rods are fixed in a rotational articulate manner to a roll bar of the vehicle body. Preferably, at least one of the center transverse bow and the rear corner transverse bow is linked on each side to the intermediate supports of the four-bar kinematic linkage.

A tension bracket is situated behind the passenger compartment of the vehicle to apply tension on the fabric cover of the folding top. The tension bracket has at least two bracket sections which are connected by an articulated joint. The multi-part tension bracket is raised via a y-parallel axis so that the storage compartment cover for the vehicle may be opened via a y-parallel axis in a collision-free manner. To ensure the swivel motion of the tension bracket, the tension bracket is linked by a guide rod to the rear main guide rod of the primary kinematic mechanism.

Optionally provided material fins are advantageously shaped by the tension bracket and by a landau bar. Preferably, the landau bar has a three part design and is linked on one end to the tension bracket and on the other end to the rear main guide rod of the primary kinematic mechanism. The three-part landau bar includes two center rotary joints with the rear center joint being adjustable beyond dead center and therefore lockable.

To allow problem-free motion of the folding top, it is advantageous for at least one window channel to be provided for lowering a rear window. The rear window is lowered before the folding top is stored, but may be raised again for use as a windbreak once the folding top is stored.

The above features, and other features and advantages of the present invention are readily apparent from the following detailed descriptions thereof when taken in connection with the accompanying drawings.

BRIEF DESCRIPTION OF THE DRAWINGS

FIG. 9 illustrates a perspective view of the folding top with a four-bar kinematic linkage in an intermediate position;

FIG. 10 illustrates a perspective view of the folding top in its stored position seen from the right rear;

FIG. 11 illustrates a perspective view of the folding top in its stored position seen from the left; and FIG. 12 illustrates a perspective view of the folding top in its stored position seen from the rear.

DETAILED DESCRIPTION OF THE PREFERRED EMBODIMENT(S)

Figure 1:
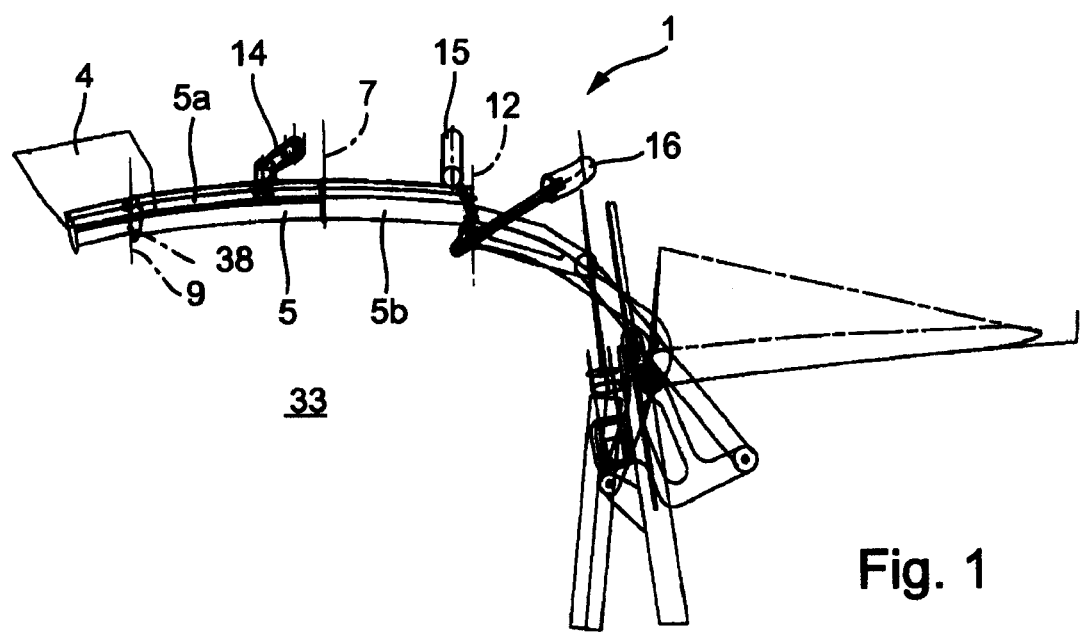
FIG. 1 illustrates a side view of a folding top having a swivellable front bow in accordance with an embodiment of the present invention with the folding top being in its closed position.

In the figures, identical components are provided with the same reference numerals.

A convertible vehicle roof 1 includes a folding top 2. Folding top 2 includes a folding top frame 3 (i.e., a folding top linkage) and a fabric cover (not shown). In general, folding top 2 is movable between a closed position in which folding top 2 is longitudinally extended and covers the passenger compartment of the vehicle and a stored position (i.e., folded position) in which folding top 2 is folded and stowed in a storage compartment in the rear of the vehicle to thereby expose the passenger compartment.

Folding top frame 3 includes a one-piece front bow 4 (i.e., a roof arch) extending transversely to the longitudinal direction of the vehicle. Front bow 4 attaches to a windshield frame of the vehicle when folding top 2 is in the closed position to secure folding top 2 to the windshield frame. Front bow 4 is slightly vertically arched to correspond to the contour of the windshield frame.

Folding top frame 3 further includes oppositely disposed first and second side rails 5, 6 (i.e., first and second lateral roof frames) which are laterally (i.e., transversely) spaced apart from one another. In the closed position of folding top 2, side rails 5, 6 extend longitudinally and are in parallel to one another. First side rail 5 includes front and rear rail sections 5a, 5b (i.e., front and rear guide rods). A z-parallel rotary joint having a z-parallel (i.e., vertical) rotational axis 7 pivotably connects front and rear rail sections 5a, 5b of first side rail 5 to one another such that rail sections 5a, 5b break inward (i.e., transverse) relative to the vehicle body when folding top 2 is folded. Likewise, second side rail 6 includes front and rear rail sections 6a, 6b (i.e., front and rear guide rods). A z-parallel rotary joint having a z-parallel rotational axis 8 pivotably connects front and rear rail sections 6a, 6b of second side rail 6 to one another such that rail sections 6a, 6b break inward relative to the vehicle body when folding top 2 is folded.

A rotary joint having a z-parallel rotational axis 9 connects front rail section 5a at its end facing away from rear rail section 5b to front bow 4. A z-parallel rotary joint having a z-parallel rotational axis 12 links rear rail section 5b to a four-bar kinematic linkage 11 (i.e., a primary kinematic mechanism 11) situated in the rear of roof 1. Likewise, a rotary joint having a z-parallel rotational axis 10 connects front rail section 6a at its end facing away from rear rail section 6b to front bow 4. A z-parallel rotary joint having a z-parallel rotational axis 13 links rear rail section 6b to four-bar kinematic linkage 11.

Folding top frame 3 further includes front, center, and rear corner transverse bows 14, 15, 16 (i.e., front, center, and rear corner transverse arches). Front transverse bow 14 is adjacent to roof bow 4; center transverse bow 15 is between front transverse bow 14 and rear corner transverse bow 16; and rear corner transverse bow 16 is situated adjacent to the rear section of roof 1.

Front transverse bow 14 includes three linkage parts 14a, 14b, 14c. Rotary joints having z-parallel rotational axes 17, 18, 19, and 20 are associated with front transverse bow 14. Linkage parts 14a, 14c are outer linkage parts and linkage part 14b is an inner linkage part. The rotary joints having z-parallel rotational axes 18, 19 articulately connect linkage parts 14a, 14b, 14c to one another. To this end, inner linkage part 14b is pivotably connected at each end to an inner end of linkage parts 14a, 14c. The rotary joints having z-parallel rotational axes 17, 20 articulately connect the outer ends of outer linkage parts 14a, 14c with respective front rail sections 5a, 6a of side rails 5, 6.

Center transverse bow 15 may swivel about a transversely extending swivel axis 21. Rear corner transverse bow 16 may swivel about a transversely extending swivel axis 22.

With reference to FIG. 9, four-bar kinematic linkage 11 includes four y-parallel rotary joints 23, 24, 25, 26. Rotary joints 23, 24, 25, 26 have transversely extending rotational axes. Four-bar kinematic linkage 11 further includes, at each of its two oppositely disposed sides, front and rear main guide rods 27, 28 and an intermediate support 29. Intermediate support 29 is connected to the first ends of guide rods 27, 28 to articulately connect guide rods 27, 28 to one another. The second ends of guide rods 27, 28 which face way from intermediate support 29 are connected to roll bars 30 on the vehicle body.

Center transverse bow 15 and rear corner transverse bow 16 are swivelably attached to intermediate support 29.

A tension bracket 31 of roof 1 applies tension on the fabric cover of folding top 2. Tension bracket 31 includes two bracket sections connected via an articulated joint. The connections of the bracket sections are not fixed to thereby prevent a rear window frame 32 of roof 1 from penetrating passenger compartment 33 of the vehicle when tension bracket 31 is raised and to thereby allow more compact storage of rear window frame 32. A guide rod 34 rotatably supports tension bracket 31 on rear main guide rod 28 of four-bar kinematic linkage 11.

Tension bracket 31 and a three-part landau bar 35 advantageously shape material fins of the fabric cover. Landau bar 35 is attached on one outer end to rear main guide rod 28 of primary kinematic mechanism 11 and is attached on its other outer end to tension bracket 31. Landau bar 35 has two center rotary joints 36, 37 of which rear center joint 37 is adjustable beyond dead center and is therefore lockable.

Front bow 4 is directly linked to front rail sections 5a, 6a of side rails 5, 6 via two rotary joints at a distance from one another. By these rotary joints, front bow 4 may swivel about a y-parallel swivel axis 38 running between front bow 4 and side rails 5, 6.

Figure 2:
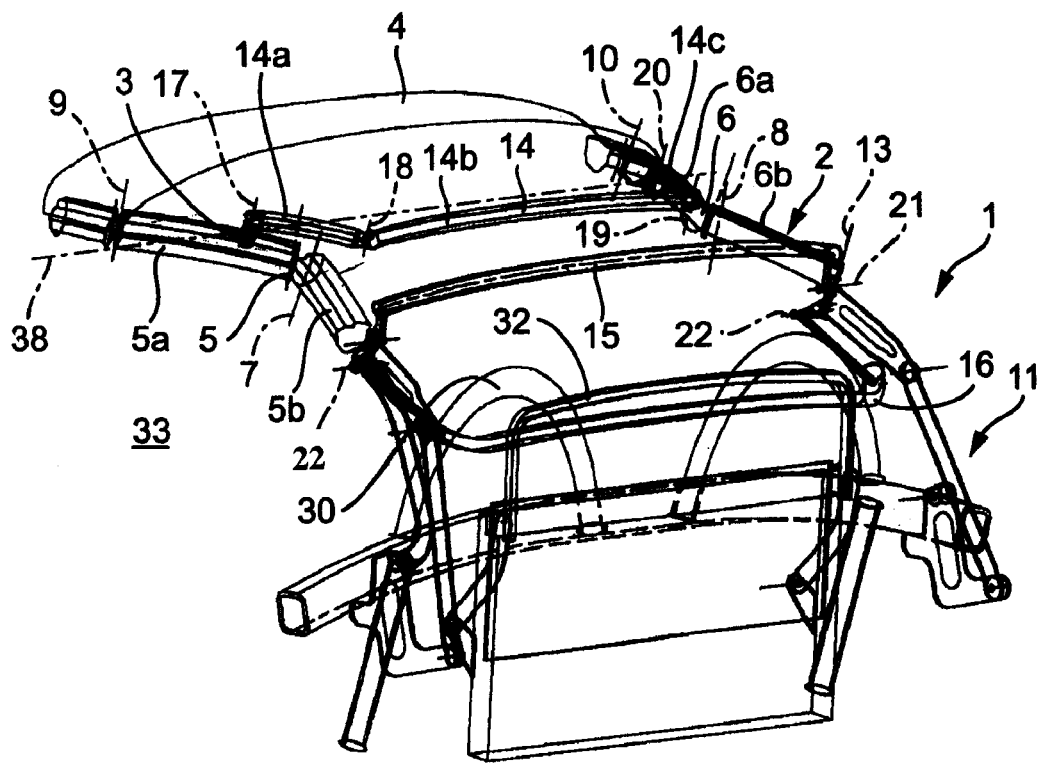
FIG. 2 illustrates a perspective view of the folding top in its closed position.
Figure 3:
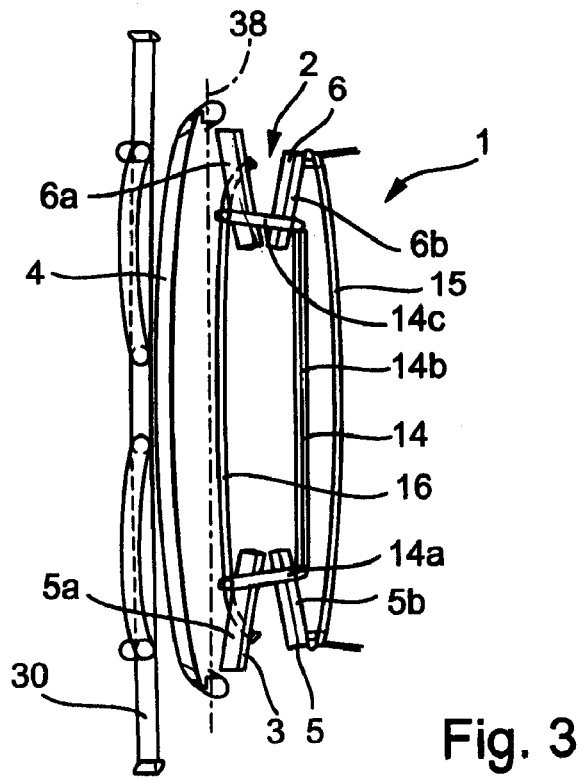
FIG. 3 illustrates a top view of the folding top in its stored position with the front bow swivelled 90° with respect to its position in the closed position of the folding top.
Figure 4:
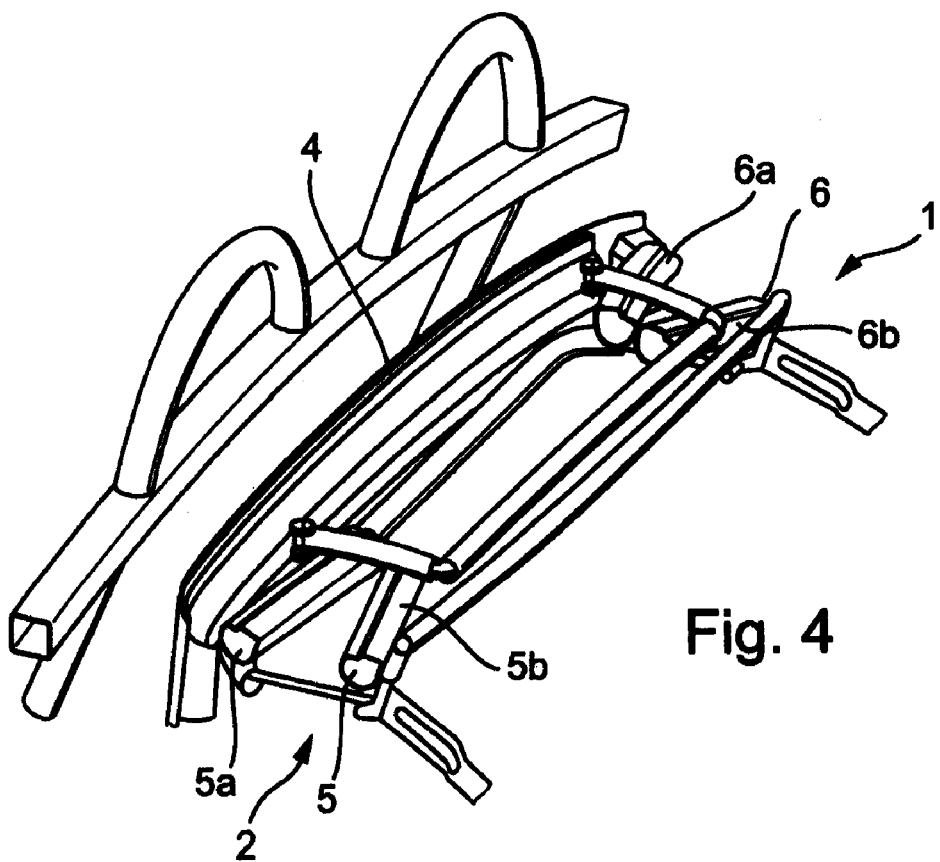
FIG. 4 illustrates a perspective view of the folding top in its stored position with the front bow swivelled 90° with respect to its position in the closed position of the folding top.

FIGS. 1 and 2 illustrate folding top 2 in its closed position. FIGS. 3 and 4 illustrate folding top 2 in its stored position. Compared to the closed position of folding top 2, front bow 4 is swivelled downward by 90° in the closed position of folding top 2 as illustrated in FIGS. 3 and 4. As the extension of front bow 4 in the closed position of folding top 2 is greater in the horizontal direction than in the vertical direction, the swiveling of front bow 4 by 90° during the storage operation saves room in the longitudinal direction for storing folding top 2.

Figure 5:
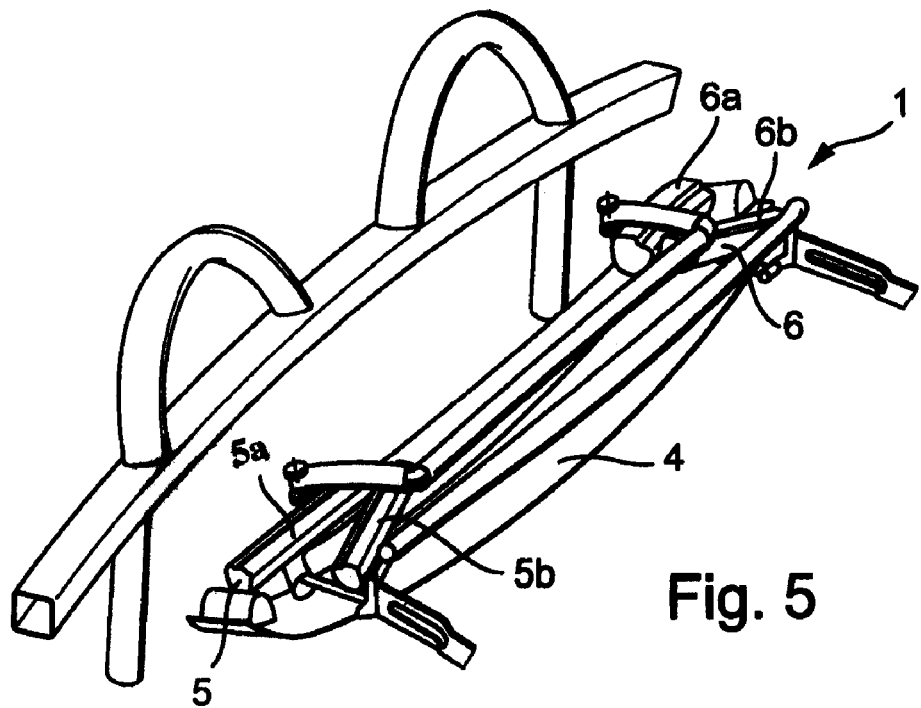
FIG. 5 illustrates a perspective view of the folding top in its stored position with the front bow swivelled 180° with respect to its position in the closed position of the folding top.

FIG. 5 illustrates folding top 2 in its stored position in which front bow 4 is swivelled by approximately 180° and is situated beneath side rails 5, 6. The space savings, associated with the embodiment shown in FIG. 5, in the longitudinal direction of the vehicle for storing folding top 2 corresponds essentially to the extension of front bow 4 in the longitudinal direction of the vehicle.

Of course, it is not necessary for front bow 4 to be linked to a folding top linkage part so as to be swivelable by exactly 90° or 180°. Other swivel angles are also possible depending on the application.

The motion of folding top 2 during the storage operation is explained in greater detail with reference to FIGS. 6 through 12. For clarity, the illustration of the swiveling of front bow 4 has been omitted. The storage operation described below may also be achieved without a swivelable front bow 4.

Figure 6:
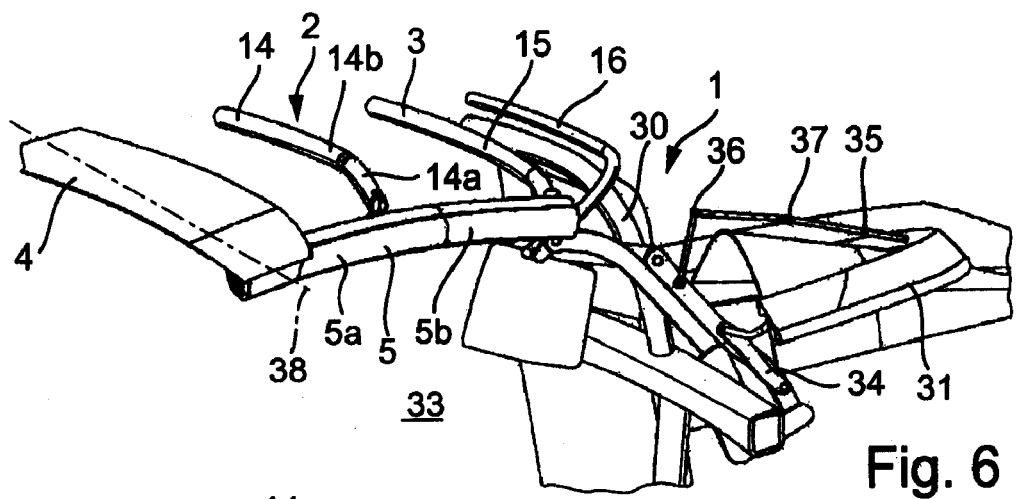
FIG. 6 illustrates a perspective view of the folding top in its closed position.
Figure 7:
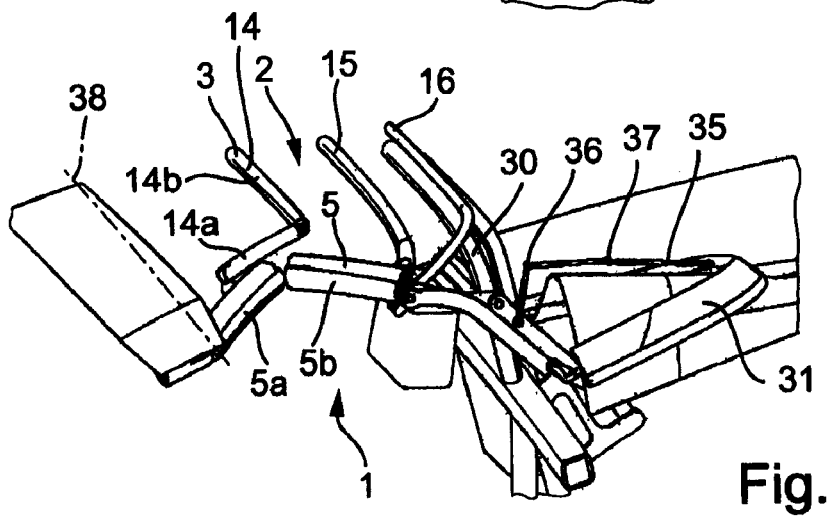
FIG. 7 illustrates a perspective view of the folding top in an intermediate position between its closed and stored positions during a folding-in operation, with side rails of a folding top frame of the folding top swivelled in the transverse direction.

FIG. 6 illustrates folding top 2 in its closed position. Front bow 4 rests against the windshield frame of the vehicle. Side rails 5, 6 run essentially in the longitudinal direction of the vehicle.

Actuation of four-bar kinematic linkage 11 causes rail sections 5a, 5b; 6a, 6b of side rails 5, 6 to complete an inward folding motion in the transverse direction. This is made possible by z-parallel rotational axes 7, 8, 9, 10, 12, and 13. In this manner front bow 4 moves linearly to the rear in the longitudinal direction of the vehicle toward rear corner transverse bow 16. On account of its multi-part structure and its four z-parallel articulated joints, front transverse bow 14 likewise moves to the rear in the longitudinal direction of the vehicle. Center transverse bow 15 and rear corner transverse bow 16 complete a rotational motion away from front bow 4.

Figure 8:
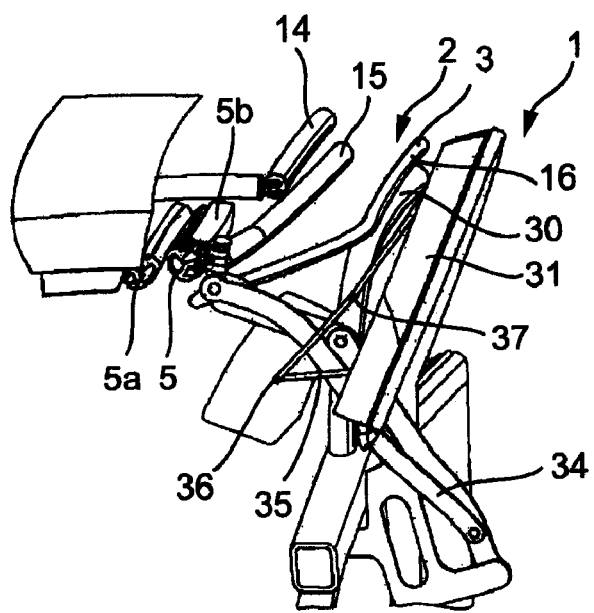
FIG. 8 illustrates a perspective view of the folding top with an opened tension bracket.

As illustrated in FIG. 8, tension bracket 31 is raised about a transverse axis so that a storage compartment cover of the storage compartment in the rear of the vehicle may be opened in a collision-free manner via another transverse axis.

FIG. 9 illustrates an intermediate position in the motion of the four-bar kinematic linkage 11. FIG. 9 shows the attachment of three-part landau bar 35 to rear guide rod 28 of four-bar kinematic linkage 11. As shown in FIG. 9, rear corner transverse bow 16 is swivelled by more than 180° during the storage operation.

FIGS. 10, 11, and 12 respectively illustrate right rear, left, and rear views of folding top 2 in its stored position.

| List of Reference Numerals | |
|---|---|
| 1 | Convertible Vehicle roof |
| 2 | Folding top |
| 3 | Folding top frame |
| 4 | Front bow |
| 5 | First side rail |
| 5a | Front rail section |
| 5b | Rear rail section |
| 6 | Second side rail |
| 6a | Front rail section |
| 6b | Rear rail section |
| 7 | z-parallel rotational axis |
| 8 | z-parallel rotational axis |
| 9 | z-parallel rotational axis |
| 10 | z-parallel rotational axis |
| 11 | Four-bar kinematic linkage |
| 12 | z-parallel rotational axis |
| 13 | z-parallel rotational axis |
| 14 | Front transverse bow |
| 14a | Linkage part |
| 14b | Linkage part |
| 14c | Linkage part |
| 15 | Center transverse bow |
| 16 | Rear corner transverse bow |
| 17 | z-parallel rotational axis |
| 18 | z-parallel rotational axis |
| 19 | z-parallel rotational axis |
| 20 | z-parallel rotational axis |
| 21 | Swivel axis |
| 22 | Swivel axis |
| 23 | y-parallel rotary joint |
| 24 | y-parallel rotary joint |
| 25 | y-parallel rotary joint |
| 26 | y-parallel rotary joint |
| 27 | Front main guide rod |
| 28 | Rear main guide rod |
| 29 | Intermediate support |
| 30 | Roll bar |
| 31 | Tension bracket |
| 32 | Rear Window frame |
| 33 | Passenger compartment of vehicle |
| 34 | Guide rod |
| 35 | Landau bar |
| 36 | Center rotary joint |
| 37 | Center rotary joint |
| 38 | y-parallel swivel axis |

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A convertible top comprising:
a folding top frame having a transversely extending front bow and a pair of oppositely disposed first and second side rails, the front bow having first and second ends, wherein the folding top frame is movable between a closed position in which the folding top frame is longitudinally extended and a stored position in which the folding top frame is folded; and
first and second rotary joints each having a transversely extending swivel axis, wherein the rotary joints respectively link the ends of the front bow to the side rails such that the front bow swivels about the transversely extending swivel axes of the rotary joints as the folding top frame moves between the closed and stored positions in order to reduce space requirements in the stored position of the folding top frame.

2. The convertible top of claim 1 wherein:
the front bow swivels 90° about the transversely extending swivel axes of the rotary joints from the closed position to the stored position.

3. The convertible top of claim 1 wherein:
the front bow swivels 180° about the transversely extending swivel axes of the rotary joints from the closed position to the stored position.

4. The convertible top of claim 1 wherein:
the front bow is one-piece.

5. The convertible top of claim 1 wherein:
the first and second side rails each have front and rear rail sections, wherein the front and rear sections of each side rail extend longitudinally when the folding top frame is in the closed position, wherein the front and rear sections of each side rail are pivotably connected to one another to fold transversely as the folding top frame moves to the stored position.

6. The convertible top of claim 5 further comprising:
a first set of three rotary joints having vertical rotational axes, the first set of three rotary joints are associated with the front and rear rail sections of the first side rail; and
a second set of three rotary joints having vertical rotational axes, the second set of three rotary joints are associated with the front and rear rail sections of the second side rail.

7. The convertible top of claim 5 further comprising:
side window seals for the front and rear rail sections of the first and second side rails.

8. The convertible top of claim 7 wherein:
each side window seal is one piece.

9. The convertible top of claim 1 wherein:
the folding top frame further includes a front transverse bow situated adjacent to the front bow, wherein the front transverse bow includes three linkage parts connected together via z-parallel articulated joints, wherein two of the linkage parts of the front transverse bow are respectively connected to the first and second side rails via two additional z-parallel articulated joints.

10. The convertible top of claim 9 wherein:
the folding top frame further includes a center transverse bow and a rear corner transverse bow, wherein the center transverse bow and the rear corner transverse bow swivel away from the front bow about respective transversely extending rotational axes as the folding top frame moves from the closed position to the stored position.

11. The convertible top of claim 9 further comprising:
a primary kinematic mechanism connected to the folding top frame for moving the folding top frame between the closed and stored positions, wherein the primary kinematic mechanism is a four-bar kinematic linkage having transversely extending rotary joints, front and rear main guide rods, and an intermediate support, wherein the front and rear main guide rods are articulately connected to one another via the intermediate support.

12. The convertible top of claim 11 wherein:
the center transverse bow and the rear corner transverse bow are linked to the intermediate support of the primary kinematic mechanism.

13. The convertible top of claim 1 further comprising:
a tension bracket for applying tension on a fabric cover supported by the folding top frame, wherein the tension bracket includes at least two bracket sections which are connected via an articulated joint.

14. The convertible top of claim 11 further comprising:
a tension bracket for applying tension on a fabric cover supported by the folding top frame, wherein the tension bracket includes at least two bracket sections which are connected via an articulated joint;
wherein the tension bracket is linked by a guide rod to the rear main guide rod of the primary kinematic mechanism.

15. The convertible top of claim 14 further comprising:
a landau bar linked on one end to the tension bracket and on the other end to the intermediate support of the primary kinematic mechanism.

* * * * *